Aug. 3, 1926.

H. B. HARTMAN 1,594,946

OZONE APPARATUS

Original Filed Oct. 10, 1921    3 Sheets—Sheet 2

Inventor

H. B. Hartman,

WITNESSES:—

By

Attorney

Aug. 3, 1926.  1,594,946

H. B. HARTMAN

OZONE APPARATUS

Original Filed Oct. 10, 1921   3 Sheets-Sheet 3

Inventor

H. B. Hartman,

By

Attorney

WITNESSES:

Patented Aug. 3, 1926.

1,594,946

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

OZONE APPARATUS.

Application filed October 10, 1921, Serial No. 506,543. Renewed January 27, 1926.

This invention relates to new and useful improvements in ozone and water mixing devices for water-purifying machines.

In the present state of the art, ozone and water mixing devices are constructed in a column formation in which means are provided for compelling the liquid to flow downwardly from the upper end to the lower end and to flow in a plurality of vortices so as to produce a partial vacuum at intervals throughout the column. Furthermore, this type of column is capable of having its height increased or diminished to meet the requirements of the conditions at the place of installation. Thus, if a single unit is employed, an extremely high column may become necessary if the requirements at the place of installation are beyond the capacity of the normal sized unit. This increase in height is due to the necessity of properly mixing the ozone and water when a larger quantity of water is to be purified. It has been the practice to connect in series a plurality of these mixing columns to a common inlet pipe. This arrangement, however, is not entirely satisfactory as it tends to vary the pressure of the water dashing through different units.

Another object of the invention is to provide an ozone and water mixing unit in which a circuitous path of relatively narrow cross sectional area is provided whereby the ozone and water will be better mixed owing to the long path of travel and also on account of the narrow passages preventing the formation of large bubbles.

A further object of the invention is to provide an ozone and air mixing unit which is constructed of a plurality of circular baffle plates which cooperate to form a circuitous path for directing the ozone and water in a radial direction from the center towards the periphery, thus producing a passage having a length much longer than the height of the unit.

In the drawings:—

Like reference characters designate corresponding parts throughout the several views.

Figure 1:
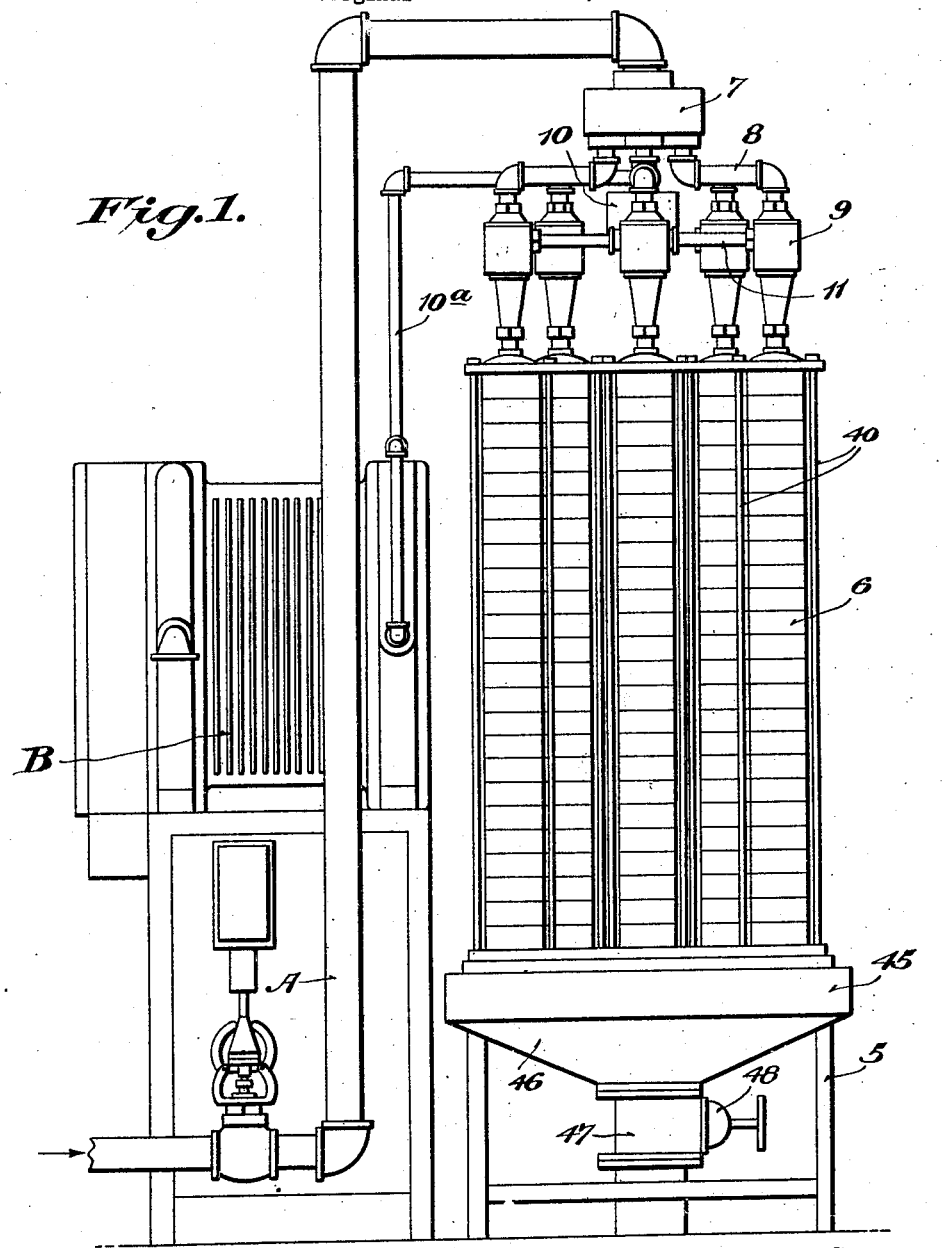
Figure 1 is an elevation showing a machine constructed in accordance with my invention.
Figure 2:
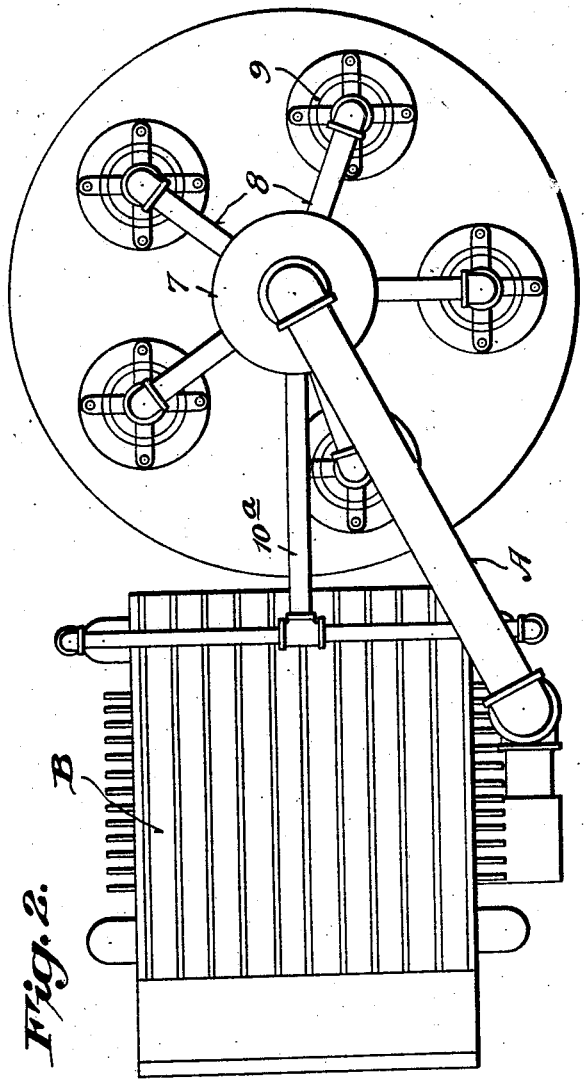
Fig. 2 is a top plan view thereof, the ozone manifold and its connections with the ejectors.
Figure 6:
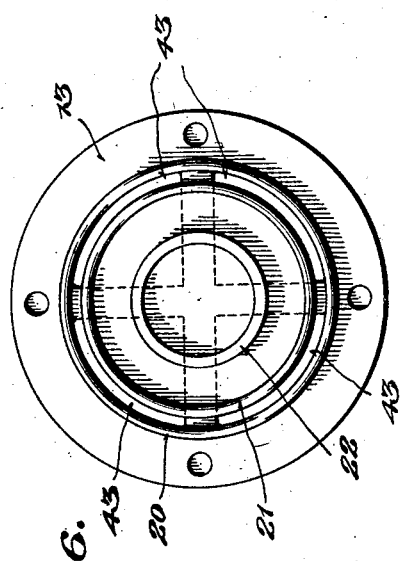
Fig. 6 is a top plan view of the bottom cap.
Figure 3:
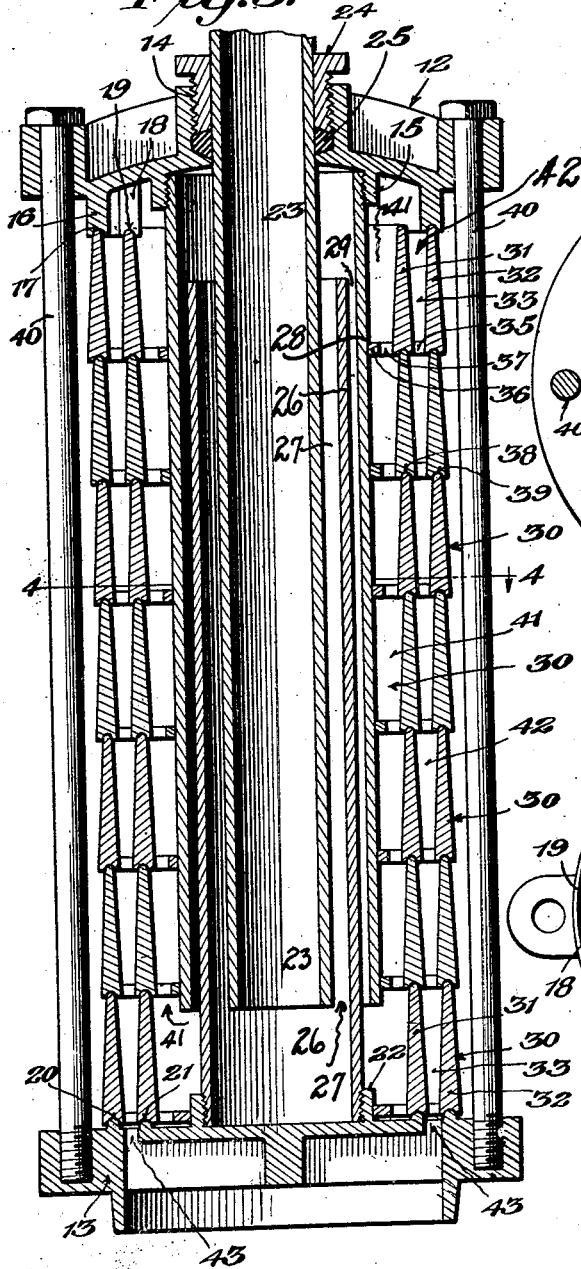
Fig. 3 is an enlarged vertical sectional view through one of the mixing units.
Figure 4:
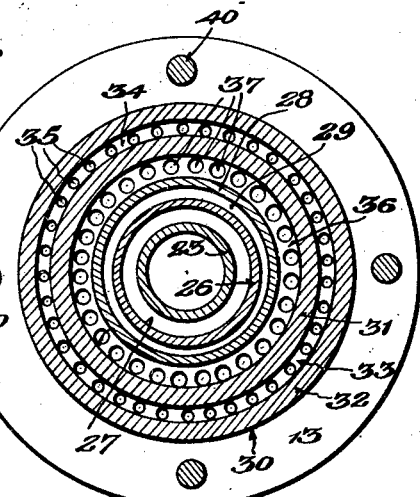
Fig. 4 is a transverse sectional view taken on the line 4—4 of Fig. 3.
Figure 5:
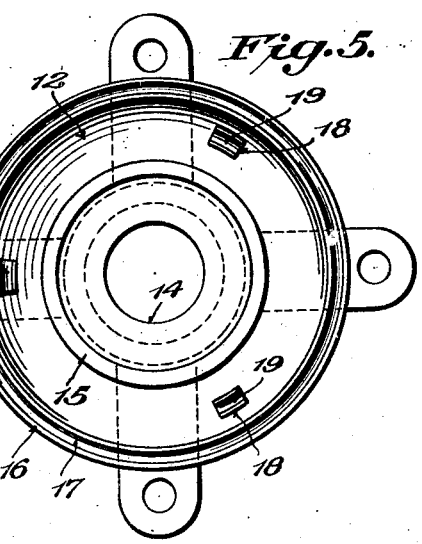
Fig. 5 is a bottom plan view of the upper cap.

Referring to the drawings, the water supply pipe is indicated at A, and the ozone generator is indicated at B. Suitably mounted on a support 5 is a plurality of ozone and water mixing units, each being designated as a whole by the reference numeral 6. The water supply pipe A is connected to a water intake manifold 7 and connected to this manifold is a plurality of water pipes 8 which respectively connect with ejectors 9, there being one ejector connected with the upper portion of each mixing unit 6. An ozone intake manifold 10 is connected by a supply pipe 10ª with the ozone generator B and each ejector 9 is connected to the ozone intake manifold 10 by a pipe 11. The ozone and water mixing units 6 are preferably arranged in a circular series so as to occupy but very little space and so as to be advantageously positioned relative to the water inlet manifold 7 and ozone inlet manifold 10, which are centrally disposed above said mixing units.

Each mixing unit 6 comprises an upper cap 12 and a lower cap 13, said caps being preferably formed of cast brass. The upper cap 12 is formed with a centrally disposed opening 14 and with downwardly extending inner and outer concentric ribs 15 and 16, the inner rib 15 being internally threaded and the lower edge of the rib 16 is formed with a groove 17. It will be understood, of course, that the ribs 15 and 16 are circular in outline. The ribs 15 and 16 are disposed in spaced relation, and arranged between these ribs and formed integral with the cap 12, is a plurality of bosses 18, each boss having a groove 19 formed in its lower face. The lower cap 13 is provided on its upper face with a plurality of curved ribs 20 and 21, which are respectively arranged in alinement with the rib 16 and the bosses 18. The ribs 20 and 21 are concentrically arranged and are disposed in spaced relation. An inner rib 22 projects upwardly from the bottom cap 13 and is disposed in concentric relation.

Disposed within the opening 14 of the upper cap 12 is an inlet pipe 23 for the water and ozone which is to be mixed as it passes through the unit. This pipe terminates at its lower end in spaced relation to but in close proximity to the bottom cap 13. This pipe is capable of being adjusted lengthwise and is held in any adjusted position by the nut 24 and packing 25. A pipe 26 which is slightly larger in diameter than the pipe 23 has its lower end threaded onto the upwardly extending flange 22 of the bottom cap 13. The pipe 26 terminates at its upper end in spaced relation to the upper cap 12. The space between the pipes 23 and 26 is relatively narrow and forms a passage 27 for the mixture. A third pipe 28 has its upper end threaded and engaged with the threaded rib 15 on the upper cap 12. The lower end of the pipe 28 terminates in spaced relation to but in close proximity to the lower cap 13. The pipe 28 is of a diameter slightly larger than the intermediate pipe 26 and consequently a narrow passage 29 is formed for the mixture.

Disposed around the pipes and between the upper and lower caps is a plurality of stacked casing members on castings, each casting being indicated as a whole by the numeral 30. Each casting comprises a spaced pair of inner and outer circular walls 31 and 32 of tapering cross section and forming a circular passage 33 therebetween. The walls 31 and 32 are connected at their lower ends by a circular web 34 which is provided with a plurality of openings 35. Extending inwardly from the lower end of the inner wall 31 is an integral flange 36 which is formed with a plurality of openings 37. The bottom of the wall 31 is formed with a recess 38 and the bottom of the wall 32 is formed with a recess 39. These castings are stacked one upon the other, the upper ends of the walls 31 and 32 fitting into the recesses 38 and 39, said recesses being preferably filled with a plastic so as to seal the connections. The lower casting is seated on the ribs 20 and 21 of the lower cap 13. The upper edge of the outer wall of the upper casting is seated in the recess of the rib 16 whereas the upper edge of the inner wall of the upper casting cooperates with the recesses 19 of the bosses 18.

The several parts are held in fixed relation by means of a plurality of bolts 40 which engage the upper and lower caps 12 and 13.

The inner walls 31 of the casing members or castings conjointly form a circular wall or baffle plate which is disposed in spaced relation to the pipe 28 so as to form an upwardly flaring or diverging passage 41 for the mixture. Inasmuch as the bosses 18 are short in length, the passage 41 has direct communication with the passage formed by the spaces 33 between the walls 31 and 32 of each casting. It will be observed that the outer walls 32 also conjointly form a circular wall or baffle plate. The passage formed by the spaces 33 of the several castings is indicated by the numeral 42.

It will also be observed that these circular passages are relatively narrow in cross section and as a result of this long and continuous passage, which is several times longer than the height of the unit, the ozone and water will be properly mixed. The mixture passes from the unit through a plurality of openings 43 formed in the lower cap 13 and communicating with the outermost or peripheral passage 42.

The mixing units 6 are supported on the top of a discharge tank 45 and this tank is formed with a conical lower portion 46 which terminates at its lower end in an outlet opening 47 having a valve 48 connected therewith. As a result of this conical bottom 45, the mixture will, providing the valve 48 is open, flow outwardly unrestricted inasmuch as a vortext will be formed by the conical bottom portion 46, and any surplus ozone which may be in the tank will be sucked outwardly through the outlet pipe 47.

From the foregoing, it will be seen that the height of each unit may be adjusted to suit requirements by adding to or taking away one or more of the castings 30. When such an adjustment is being made, the end cap 12 may be readily shifted and at the same time the pipes 23, 26 and 28, which are disposed in telescopic relation will be relatively shifted endwise.

When assembling a unit, the pipe 26 is screwed onto the rib 22 of the lower cap 13, and the pipe 28 is screwed onto the rib 15 of the upper cap 12. The castings 30 are then positioned in superposed relation on the ribs 20 and 21 of the lower cap 13, the joints between the castings being sealed by a suitable plastic. The upper cap 12 with the pipe 28 attached thereto is then placed on the top of the castings, the upper edge of the outer wall of the top casting fitting into the recess 17 of the rib 16 which is carried by the upper cap. The bosses 18 of the upper cap serve to steady the castings. The pipe 28 is of course positioned between the castings and the pipe 26. The bolts 40 are then utilized to clamp the upper and lower caps against the superposed castings. The inlet pipe 23 is then positioned in the opening 24 and is rigidly secured therein by the nut 24 and packing 25, the corresponding ejector 9 being connected to the upper end of the inlet pipe 23.

In operation, water is fed under pressure through the pipe A to the water intake manifold 7 and from this manifold the water is evenly distributed to the ejectors and thence to the inlet pipes 23 of the mixing units. The ozone is fed from the generator B through the pipe 10ª to the ozone intake manifold 10. The water passing through the ejectors draws equal quantities of ozone from the ozone manifold 10 through the pipes 11 to the respective ejectors. The water and ozone thus begin to mix in the ejectors. The water and ozone are thence fed under pressure through the inlet pipes 23 to the several mixing units. The mixture then passes upwardly through the passage 27 formed by the pipes 23 and 26, thence over the upper end of the pipe 26 and down the passage 29 formed by the pipes 26 and 28. The mixture then passes upwardly through the passage 41 formed by the pipe 28 and the inner and upwardly tapering walls of the castings, thence over the top of the uppermost inner wall and thence downwardly through a passage 42 formed by the converging aligned spaces 33 of the castings. The water and ozone are thus thoroughly mixed, and the mixture then passes outwardly through the openings 43 which are formed in the lower cap. The mixture then passes into the discharge tank 45 and as the mixture strikes the lower or conical portion of the tank, the valve 48 being open, a vortex is produced which draws any surplus ozone, which might be in the tank, into the pipe line and distributes it into a swimming pool or other place.

Also by reason of the tapering cross section of the circular units which form the built-up circular walls 31 and 32, a plurality of upwardly diverging and downwardly converging chambers are formed within adjacent concentric rings. The effect of this construction is to further agitate the passage of the water and ozone through the apparatus, thereby to insure thorough mixing.

From the above it will be seen that in each mixing unit, there is an extremely narrow circuitous passage for the water and ozone and by reason of the vertically disposed baffles, the water is turned over several times during its complete passage through the unit. The possibility of creating large bubbles is thereby avoided, and the water and ozone are compelled to mix so as to render the water sterile.

What I claim as my invention is:—

1. A mixing column for water purifying apparatus comprising a casing consisting of end caps respectively having a central intake opening and a peripheral outlet opening, a plurality of tubular members arranged in spaced telescopic relation and alternately carried by said opposite end caps, and spaced concentric casing elements establishing communication between the outer of the tubular members and said peripheral outlet of one of the end caps.

2. A mixing column for water purifying apparatus comprising a casing consisting of end caps respectively having a central intake opening and a peripheral outlet opening, a plurality of tubular members arranged in spaced telescopic relation and alternately carried by said opposite end caps, and spaced concentric casing elements surrounding the tubular members, the innermost one of said casing elements cooperating with the outermost tubular member to provide a plurality of upwardly diverging chambers, and the outer casing element cooperating with the adjacent inner casing member to provide a plurality of downwardly converging passages leading to said peripheral discharge opening of one of said end caps.

3. A mixing column for water purifying apparatus consisting of inlet and discharge end caps, and means for forming a circuitous passage between said end caps consisting of centrally disposed pipe members arranged in telescopic relation, and outer casing members consisting of a plurality of matching and interfitting units having passages therein which form a part of said circuitous passage leading to the discharge opening of the discharge end cap.

4. In a water and ozone mixing unit, the combination with upper and lower caps respectively formed with a centrally disposed inlet opening and a peripherally disposed outlet opening, of a plurality of vertically disposed tubes respectively connected to said caps and arranged in telescopic relation to form a series of connected vertical passages, and a plurality of superposed circular castings disposed between said caps and surrounding said tubes and spaced therefrom, the lower edges of the castings being respectively formed with circular recesses for receiving the upper edges of the respective under castings.

5. In a water and ozone mixing unit, the combination with upper and lower caps, respectively formed with a centrally disposed inlet opening and a peripherally disposed outlet opening, of a plurality of vertically disposed tubes respectively connected to said caps and arranged in telescopic relation to form a series of connected vertical passages, and a plurality of superposed circular castings disposed between said caps and surrounding said tubes and spaced therefrom, each of said castings including spaced circular walls, the walls of the castings being arranged in vertical alignment to form a resultant vertical passage communicating at its intake end with the first mentioned passages and at its discharge end with said outlet opening.

6. In a water and ozone mixing unit, the combination with an upper cap having a centrally disposed inlet opening, of a lower cap having a peripheral outlet opening, an inlet pipe extending downwardly through said inlet opening and terminating in spaced relation to the lower cap, a tube of larger diameter than the inlet pipe fixed to the lower cap and surrounding said inlet pipe, the upper end of said tube being spaced from the upper cap, a second tube having a larger diameter fixed to the upper cap and surrounding said first mentioned tube, the lower end of said second mentioned tube being spaced from the lower cap, and a plurality of superposed circular castings surrounding said second mentioned tube and spaced therefrom, said tubes and castings cooperating to form a series of vertically disposed connected passages for mixing the water and ozone and directing the mixture radially from the inlet pipe to the peripheral outlet opening.

In testimony whereof I hereunto affix my signature.

HARRY BUXTON HARTMAN.